United States Patent [19]

Kurszewski et al.

[11] Patent Number: 5,434,738
[45] Date of Patent: Jul. 18, 1995

[54] APPARATUS AND METHOD FOR PROTECTING INDUCTION MOTORS FROM MOMENTARY POWER LOSS

[75] Inventors: Chad J. Kurszewski, Stoddard; Matthew A. Shepeck, Holmen; Michael W. Murry, Onalaska, all of Wis.

[73] Assignee: American Standard Inc., Pisdataway, N.J.

[21] Appl. No.: 88,946

[22] Filed: Jul. 12, 1993

[51] Int. Cl.⁶ ............................................. H02H 3/26
[52] U.S. Cl. ....................................... 361/23; 361/33; 361/85
[58] Field of Search .................. 361/23, 51, 85, 31, 361/33; 318/786

[56] References Cited

U.S. PATENT DOCUMENTS

| | | | |
|---|---|---|---|
| 4,291,543 | 9/1981 | Alluto | 62/158 |
| 4,319,298 | 3/1982 | Davis et al. | 361/24 |
| 4,751,449 | 6/1988 | Chmiel | 318/786 |
| 4,751,653 | 6/1988 | Junk et al. | 364/481 |
| 4,802,053 | 1/1989 | Wojtak et al. | 361/85 |
| 4,990,057 | 2/1991 | Rollins | 417/12 |
| 5,056,032 | 10/1991 | Swanson et al. | 364/483 |
| 5,058,031 | 10/1991 | Swanson et al. | 364/483 |

*Primary Examiner*—A. D. Pellinen
*Assistant Examiner*—S. Jackson
*Attorney, Agent, or Firm*—William J. Beres; William O'Driscoll; Peter D. Ferguson

[57] ABSTRACT

An apparatus and method for protecting an induction motor from momentary power loss in a three-phase, alternating current, power supply. The apparatus includes a circuit for detecting when the motor switches from a mode of operation as a motor to a mode of operation as a generator, and a microprocessor connected to the detector to receive the detection of a switch in mode of operation, and for generating a fault disconnect signal in response thereto to initiate disconnecting the motor from the power source. The method includes the steps of detecting when the motor switches from a mode of operation as a motor to a mode of operation as a generator and generating a fault disconnect signal in response thereto to initiate disconnecting the motor from the power source. The apparatus and method provide for robustness of the fault detection data, and for avoiding false detections of momentary power loss.

19 Claims, 3 Drawing Sheets

APPARATUS AND METHOD FOR PROTECTING INDUCTION MOTORS FROM MOMENTARY POWER LOSS

TECHNICAL FIELD

This invention generally pertains to a microcomputer based momentary power loss fault detector for use with three-phase circuits. More particularly, it relates to a uniquely reliable fault detector and fault detection method for initiating a disconnect of an induction motor from a source of three-phase power in response to the detection of a momentary power loss.

BACKGROUND OF THE INVENTION

Induction motors are widely used electric motors. Such motors include a fixed stator that is mounted inside the motor casing. The stator comprises a series of stationary windings with a large cylindrical opening in the center. A rotor having a series of windings mounted on a rotatable shaft is mounted inside the stator opening. The rotor is free to revolve within the opening. Application of electric power to the stator produces a rotating magnetic field in the stator, which induces high currents in the rotor. The rotor currents, in turn, produce their own magnetic fields, which interact with the main field generated in the stator and make the rotor turn.

Induction motors are easy to manufacture and are essentially trouble-free in actual service. In a practical induction motor, the rotor consists of a laminated iron core which is slotted lengthwise all around its periphery. Solid bars of aluminum, copper or other conductors are tightly pressed or imbedded into the slots. At both ends of the rotor, short-circuiting rings are welded or brazed to the bars to make a solid structure for placement on the iron core. The short circuiting rings actually form shorted turns that have currents induced in them by the field flux. When assembled, the periphery of the rotor is separated from the stator by a very small air gap. The width of the air gap is as small as mechanically possible to ensure that the strongest possible electromagnetic induction takes place.

For the induction motor to run, the rotor must rotate at a slightly slower speed than the rotating magnetic field of the stator. If the rotor turned at exactly the same speed as the stator field, there would be no relative difference in motion between the field and the rotor. The bars in the rotor would not cut the field flux lines and no current would be induced in the rotor. The difference between the field and the rotor speed is known as slip. Rotors tend to slip behind the field speed by two to ten percent and the slip will increase as the load on the motor increases.

Three-phase inductive motors, as well as many other three-phase loads, are susceptible to damage due to momentary power supply faults, such as are caused by line power loss and buss transfers. Simply put, this means that to momentarily shut off the power to an operating electric motor and then turn the power back on again while the motor is still spinning may cause damage to the motor and to the equipment that the motor was driving at the time of the power interrupt. A procedure is needed, therefor, to detect when the power has been turned off and to disconnect the motor from the power line before the power is restored, so that when the power is restored., it is not fed to the motor. By doing this, damage to the motor and the equipment that is being powered by the motor is avoided.

As indicated, the purpose of momentary power loss protection is to protect the inductive motor and related components from the damaging effects of power interruptions. Related components that can be damaged by a power interruption may include compressor impellers, shaft key ways, and starter contacts.

Power interruptions can result from loss of external line power and internal buss transfers. An external line power failure is failure of the power as it comes from the power utility generating station. Such failures may occur due to weather effects on the line transmission equipment or from the switching of generator sources at the power utility, or from a failure at the power utility. An internal buss transfer comprises a switch from one power source to another, such as might occur when automatically switching from external utility line power to a backup generator at the facility in which the motor is installed. It should be remembered that the types of faults that this invention is concerned with are those in which there is a momentary loss of power followed virtually immediately by a restoration of power.

Momentary power interruptions may be unexpected as in the case of power line switching closures, brown-outs and substation transfers. They may also be expected, resulting from buss transfers to an alternate power source within a facility. Whether expected or unexpected, interruptions result in large transient currents up to twelve times full load amperage and transient torques up to twelve times full load torque or twenty times full load torque if power factor correction capacitors are used in conjunction with the induction motor.

In inductive motors, the reconnection currents that are presented due to a momentary power loss generate large electromagnetic forces between neighboring stator windings as well as between the rotor bars. This exposes the stator end windings and the rotor shorting rings to excessive stress. This stress has been identified through studies and experience as causing or accelerating motor failures. Failure of the motor is typically not immediate but is most often seen as accelerated wear and greatly reduced motor life.

The large transient torques that result from the loss of power and quick reapplication of the power may be negative at times. Such negative torques may attempt to reverse the direction of rotation of the motor and cause damage to the equipment that is being powered by the motor. Impellers that may be powered by an induction motor, for instance, are often affixed to the shaft on which the impellers rotate by aligned grooves or key ways in the shaft and the impeller. A key is inserted in the key ways to rotationally mate the impeller to the shaft. Slapping of the key ways and exposure of the impellers to large mechanical stresses can occur as the result of a momentary power loss that causes the motor to try to reverse direction of rotation by the transient torques.

The above potentially damaging interrupts need to be distinguished from noise on the line and from the loss of a single phase of the three-phase power. Noise can be the result of weather effects on the power received from the power lines, such as may be caused by an electrical storm or the switching on and off of nearby machines, and is usually a transient condition. Shutdowns of the motor as a result of detecting such occurrences as noise are considered nuisance shutdowns. Three phase power is alternating power and requires three lines to deliver the power. On occasion, one phase of the power is lost. In such instances, the motor will continue to operate, but in a single phase mode of operation. A single phase loss may cause motor damage and is detected using a separate and slower mechanism.

Although a wide variety of fault detectors for use in three-phase circuits are presently available, the time response window of conventional fault detectors is inadequate. Some conventional detectors respond too slowly to critical faults and damage can quickly occur when the detector does not interrupt the power supply before power is restored. Other detectors respond too quickly to less critical faults where a slower response would avoid false alarms.

Moreover, in many applications, conventional fault detectors do not distinguish a momentary power loss from noise. As a result, such detectors needlessly trip the motor off in the presence of mere noise on the lines. A false trip may also occur in the event of a loss of one phase of the line power. It is desirable to absolutely minimize such false trips, since they are costly in the maintenance actions required to reinitialize the motor and the equipment powered by the motor and in lost time for the work which the motors are intended to be performing.

The ultimate goal of momentary power loss protection circuits is to disconnect the motor from the power line before the duration of the interruption allows the reconnection currents and torques to achieve a damaging level. For very short power interruptions (defined here as less than 1 to 2 line cycles), the reconnection transients are less than those seen for a normal start of the motor and, therefore, are not destructive to the motor. It is just as well that the motor not be decoupled in the event of such short duration power losses so that the motor will be powered again when power is restored after the short interrupt. Since the motor is not injured by the reapplication of power, this avoids an unnecessary shutdown.

Likewise, for very long power interruptions (defined here as greater than six seconds), the reconnection transients are also below the transients seen for a normal start of the motor. As is indicated above, in cases where the reconnection transient is less than the current and torque experienced during a normal start-up, the motor will not be injured by the reconnection and it is desirable to permit such reconnection to occur in order to avoid an unnecessary shutdown.

Power interruptions of a duration between the above defined short and long power interruptions result in reconnections which are potentially destructive to the motor. Optimal momentary power loss protection would protect the motor from reconnections falling within that window of time, but would not permanently disconnect power when momentary power losses of a duration outside of the designated time window are detected. No adequate momentary power loss protection for the defined duration currently exists. The main function of the present invention is to disconnect the motor from the line in the event of power interruptions lasting for more than one or two line cycles. Thus when a long interruptions occurs, the motor has already been removed from the line power source.

It is accordingly an object of the present invention to provide a momentary power loss detection system that is capable of distinguishing faults that occur in a time regime between short duration power faults and long duration power faults.

It is another object of the present invention to provide a momentary power loss detector that is microcomputer based, thereby minimizing the number of discrete electrical elements necessary to perform the detection function.

Still another object of the present invention is to provide a momentary power loss detection system in which robustness of the data is inherent.

These and other objects of the invention will be apparent from the attached drawings and the description of the preferred embodiment which follow hereinbelow.

SUMMARY OF THE INVENTION

The present invention is a device and method for reliably detecting a momentary power loss of the desired duration; the duration being between a minimum of one to two line cycles and a maximum of six seconds. The invention accomplishes this while avoiding false shutdowns due to noise and power phase loss. The invention is able to distinguish a momentary power loss that is due to a utility line loss and to a buss transfer and thereby provides a reliable signal with which to initiate disconnecting the motor from the power source in the event of detecting such power failures.

The apparatus in accordance with the present invention is a fault detector for detecting a momentary power loss in a three-phase, alternating current power supply, the power supply being connected to and powering a motor. The fault detector includes a detector circuit which has a microprocessor for detecting when the motor switches from a mode of operation as a motor to a mode of operation as a generator. The microprocessor, upon detecting a motor mode switch of operation, generates a fault disconnect signal in response thereto to initiate disconnecting the motor from the power source.

The method in accordance with the present invention includes a procedure for detecting a momentary power loss in a three-phase, alternating current, power supply, the power supply being connected to and powering a motor. The method includes the steps of detecting when the motor switches from a mode of operation as a motor to a mode of operation as a generator and then generating a fault disconnect signal in response thereto to initiate disconnecting the motor from the power source.

DESCRIPTION OF THE PREFERRED EMBODIMENT

During a loss of power, the residual flux of an induction motor, as it rotates in an unpowered condition, is great enough to produce a generated voltage and regeneration of the generated voltage back into the utility power grid. The regeneration into the utility power grid provides adequate excitation to keep the motor contact pulled in, thereby keeping the motor connected to the main power lines. For very short duration power losses, while the motor is still connected to the utility main power lines, the difference of the line voltage and the motor's regenerated voltage appears at the motor terminals, as indicated in the following analysis.

Figure 2:
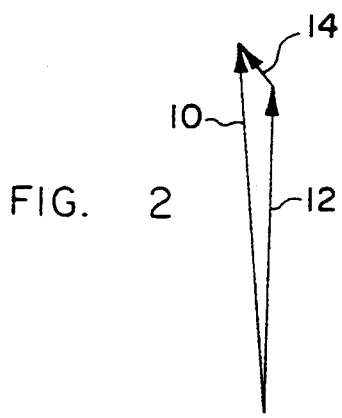
FIG. 2 is a vector diagram of the voltages presented to an inductive motor immediately after a momentary power loss.

Immediately after a loss of power, the regenerated voltage measured at the motor terminals is in phase with, and approximately ninety percent of the magnitude of the line voltage. This condition is depicted in FIG. 2, where the line voltage vector is illustrated at 10, the regenerated voltage is illustrated at 12, and the resultant voltage vector is illustrated at 14. The resultant voltage 14 at this time is small and no damage will occur if reclosure would take place within this very short time. The angular difference between the line voltage 10 and the regenerated voltage 12 is a function of elapsed time from the time of the occurrence of the momentary power loss and the time of reapplication of the line power to the motor. The elapsed time that is depicted in FIG. 2 is less than two line cycles.

Figure 3:
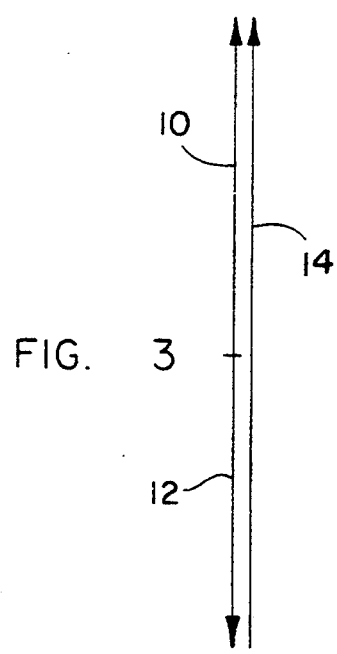
FIG. 3 is a vector diagram of the voltages present to the motor after a momentary power loss when the line voltage and the motor's regenerated voltage are 180° out of phase.

As time progresses from the occurrence of the momentary power loss, the phase difference between the voltages becomes greater due to the unpowered motor (now acting as a generator) slowing down and no longer operating at slip speed with the line power. The motor is now operating at less than the slip speed. Extreme reclosure currents can occur when the line voltage 10 and the motor's regenerated voltage 12 are 180 degrees out of phase at the time that the line power is reapplied to the motor. This condition is depicted in FIG. 3, where, as in FIG. 1, the line voltage vector is illustrated at 10, the regenerated voltage is illustrated at 12, and the resultant voltage vector is illustrated at 14. In this condition the resultant voltage vector 14 would be approximately twice the line voltage 10 assuming that the magnitude of the induced voltage did not decay significantly. During reapplication of line power, this excessive resultant voltage 14 present at the motor terminals causes in-rush currents of approximately two times the current experienced by the motor during a normal across-the-line start which is approximately twelve times the full load current.

Figure 4:
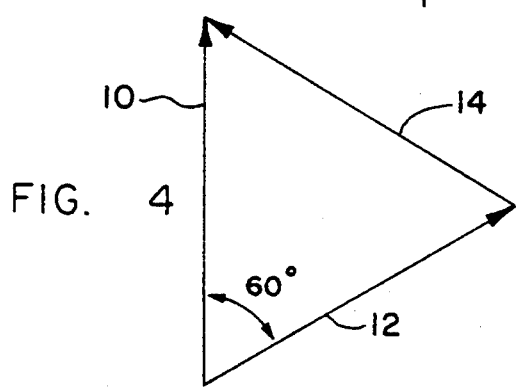
FIG. 4 is a vector diagram of the voltages present to the motor after a momentary power loss when the line voltage and the motor's regenerated voltage are 60° out of phase.

The safe area of reapplication of line power occurs as depicted in FIG. 4, where the resultant voltage 14 is no greater in magnitude than the line voltage 10. This results in in-rush currents no greater than a normal across-the-line start of the motor. This is possible when the phase difference between the line voltage 10 and regenerated voltage 12 is less than 60°. When the line voltage and regenerated voltage are approximately equal in magnitude, and out of phase by 60°, the vector addition drawing illustrates that this forms an equilateral triangle, guaranteeing that the magnitude of the resultant voltage 14 is the same as the magnitude of the line voltage 10.

It is known that the maximum transient electrical torque occurs when the regenerated voltage is 0.95 per-unit as compared to line voltage with a reapplication angle of 120° between the regenerated voltage and the line voltage. These parameters yield a peak torque of 12.3 times the normal torque. It has also been shown that with lower regenerated voltages (less than 0.30 per-unit), the peak electrical torque occurs at a reapplication angle of about 90°. Reclosure under that condition results in a peak transient torque of 2.53 per-unit, or 127% of the rated motor pullout torque. It should be noted that these exact figures are motor dependent, but do not deviate significantly from motor to motor.

In order to protect the motor from these potentially damaging excessive torques and currents, the motor contact should be opened, disconnecting the motor from the power lines before these conditions appear, e.g. before reapplication of power from the power lines occurs. As stated earlier, momentary power losses of very short duration (less than two frequency cycles) are not damaging to the motor because the angle between the applied voltage and regenerated voltage is minimal. For an interrupt of significantly greater duration, when the regenerated voltage has decayed to less than twenty-five percent of the line voltage, the peak torques and currents resulting from reapplication of line power are also known to be non-damaging. Such losses typically have a duration in excess of six seconds. It is the momentary power losses that fall in the window between these two non-damaging losses that the motor needs to be protected from.

Figure 5:
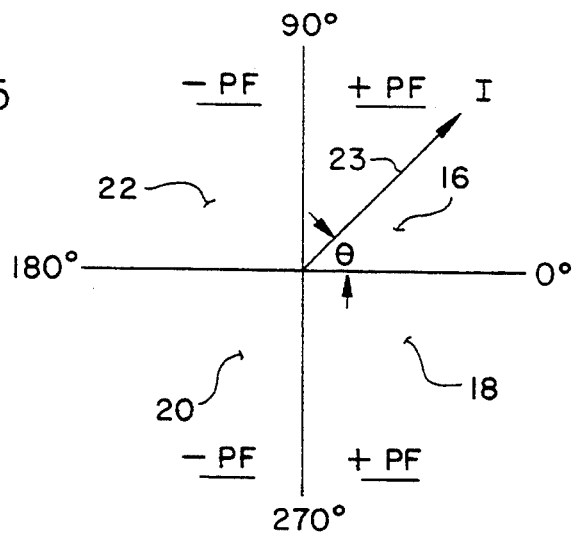
FIG. 5 is a diagram of power flow based on power factor.

Protection of the motor starts with the detection of the power loss condition. This is accomplished by determining when the motor leaves the motor operation mode and enters the generator operation mode. This detection can be achieved by observing the phase relationships between the motor's voltage and current. Based on the fact that power flow and power factor are directly related, it can be determined if the motor is functioning as a motor or as a generator. A positive power factor exists when the motor is consuming power and a negative power factor exists when the motor is delivering (or generating) power. When the motor is generating power, a momentary power loss condition definitely exists. These relationships are depicted in FIG. 5, which is a plot of power flow as indicated by power factor, PF. FIG. 5 shows four distinct quadrants 16, 18, 20, 22. Each quadrant 16, 18, 20, 22 is defined by the phase angle (theta) of current I with respect to the voltage V. In FIG. 5 the voltage vector is defined as a reference at a phase angle of 0°. The current vector may move with respect to the voltage vector through phase angles of 0° to 360°. Since the quadrants are defined by the phase angle of the current I with respect to the voltage V, the four quadrants can be represented as a first quadrant 16 having a phase angle of 0° to 90°, a second quadrant 22 having a phase angle of 90° to 180°, a third quadrant 20 having a phase angle of 180° through 270°, and a fourth quadrant 18 having a phase angle of 270° through 360° (or 0°).

Power factor, PF, is the ratio of true power (power actually consumed) to apparent power (simple product of voltage and current). Since the power factor PF is defined in terms of the relationship of the current vector with respect to the voltage vector, the power factor is directly indicated by the phase angle (theta). When the motor 44 is consuming power by acting in a motor mode, the phase angle (theta) of the current I with respect to the voltage V falls in the quadrants 16 and 18. Quadrants 16 and 18 are therefore considered to be the positive power factor region. When the motor 44 is regenerating power by acting in a generator mode, the phase angle (theta) of the current I with respect to the voltage V falls within quadrants 20 and 22. Thus quadrants 20 and 22 are considered to be the negative power factor region.

Quadrant 18 represents an induction motor operating in the motor mode. Quadrant 16 represents an induction, synchronous or other type of motor operating in the motor mode but either being excited to appear capacitive or being modified by the addition of over sized power factor correction capacitors. Quadrant 22 represents a motor operating in a generator mode so as to regenerate into a predominantly inductive power line. Quadrant 20 represents a motor operating in a generator mode so as to regenerate into a predominantly capacitive power line. Operation in quadrants 16 and 18 represents the normal running condition of the motor, while operation in quadrants 20 and 22 is indicative of a momentary power loss condition.

Power factor PF is independent of the magnitude of the current I and the magnitude of the voltage V, but is dependent upon the phase angle (theta) of the current I with respect to the voltage V. The present invention detects the positive or negative polarity of the power factor PF to determine whether the operating mode is as a motor or as a generator. It is not necessary to actually calculate the magnitude of the power factor.

Figure 6:
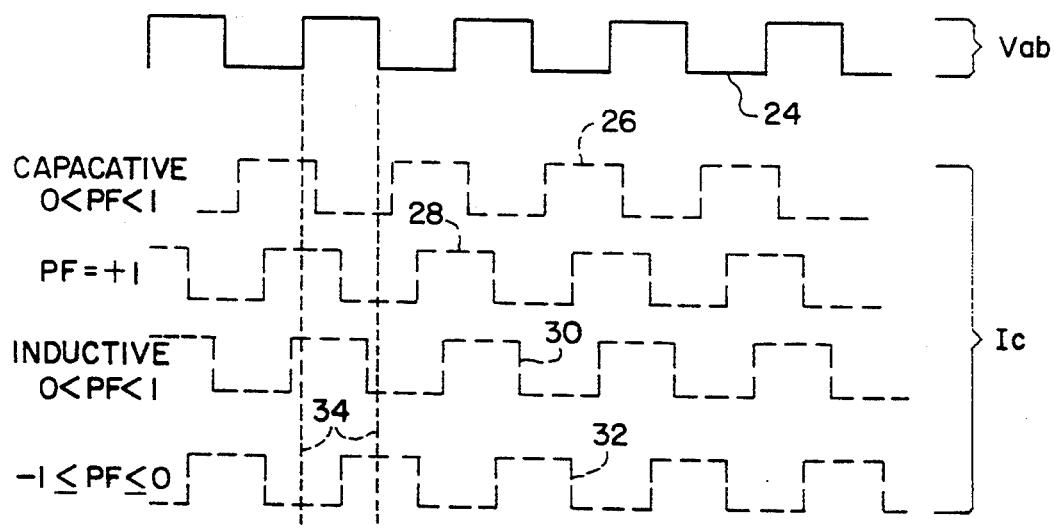
FIG. 6 illustrates electrical wave forms representative of line current and line to line voltage in the inductive motor as presented to the microprocessor of the momentary power loss detector.

Instead, to determine the polarity of the power factor, the present invention examines the line to line voltage, Vab, and the phase current, Ic. By convention, the three phases of the line power are designated by the subscripts a, b, and c. The relationships (using squared up sine waves) are depicted in FIG. 6, where sine wave 24 represents the line to line voltage, Vab, sine wave 26 represents the current Ic with a capacitive load, sine wave 28 represents the current Ic with a resistive load, wave 30 represents the current Ic with a inductive load, and sine wave 32 represents the current Ic with a negative power factor. Thus the sine waves 26, 28 and 30 each represent a positive power factor and a normal operating condition of the motor 44, while the sine wave 32 generally represents a negative power factor and an abnormal operating condition of the motor 44.

For all types of loads, whether capacitive, resistive, or inductive as depicted by the sine waves 26, 28, and 30, it is noted, by referring to dashed lines 34, that for all positive going edges of Vab, Ic is positive and for all negative going edges of Vab, Ic is negative. A positive Ic represents a logic state of 1, or a high logic state. A negative Ic represents a logic state of zero, or a low logic state. This represents the situation when the motor is operating as a motor. As soon as the motor commences to function as a generator (due to a momentary power loss), this relationship no longer holds true. In fact, it is just the opposite logic. As depicted in sine wave 32, for all positive going edges of Vab, Ic is negative, for all negative going edges of Vab, Ic is positive. Squared sine waves 26, 28, and 30 represent conditions of positive power factor when the motor is operating as a motor. Squared sine wave 32 represents the condition of negative power factor when the motor is operating as a generator. It is this relationship of the opposite logic for the motor mode of operation and generator mode of operation that forms the basis for the momentary power loss detection strategy of the present invention.

Figure 1:
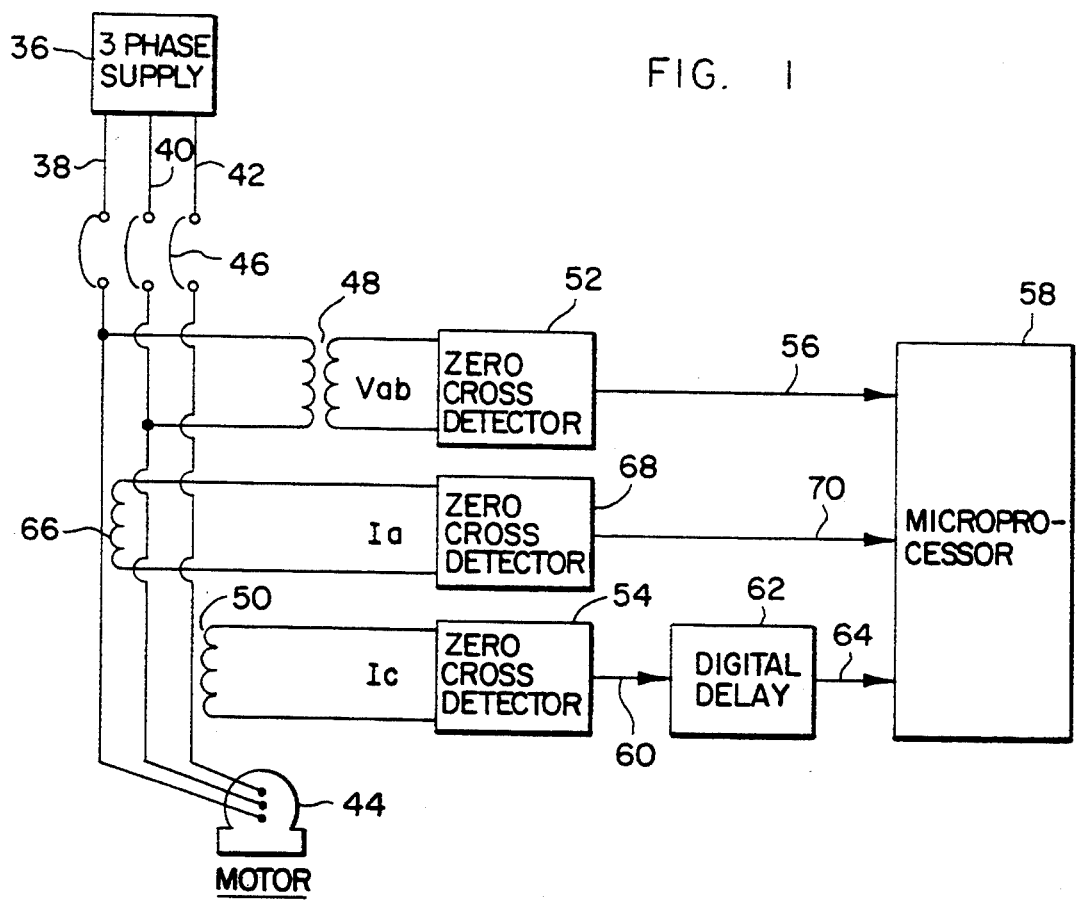
FIG. 1 is a schematic diagram depicting a momentary power loss circuit in accordance with the present invention in conjunction with a three phase power supply and a three phase inductive motor.

The block diagram depicted in FIG. 1 illustrates the hardware implementation portion of the momentary power loss detection scheme of the present invention. A three-phase alternating power supply 36 provides electrical power through conductors 38, 40, and 42 to a three-phase inductive motor 44. Three-phase contact 46 provides a switching device to isolate the motor 44 from the power supply 36, as desired. The three phases of supply 36 are referred to as a, b, and c, corresponding to conductors 38, 40, and 42 respectively. Transformers 48, 50, and 66 provide current and voltage signals to zero cross detectors 52, 54, and 68 respectively. Zero cross detectors 52 and 68 provide squared sine wave signals to the microprocessor 58. Zero cross detector 54 provides a squared sine wave signal to a digital delay 62, which in turn applies a selected time delay to the signal and then sends the signal to the microprocessor 58. The microprocessor 58 applies programmed logic to the incoming signals and determines if a momentary power loss condition exists.

Referring again to FIG. 1 for the description of the detection technique, the line to line voltage Vab is obtained from a potential transformer (PT) 48 and the phase current Ic is obtained from a current transformer (CT) 50, both sized accordingly for the motor application. These signals are fed into zero cross detectors 52, 54, respectively. The zero cross detectors 52, 54 take the input AC signals of varying magnitude and output a 50% duty cycle, logic level squared signal. The output 56 of the zero cross detector 52 is provided directly to the microprocessor 58.

The output 60 of the zero cross detector 54 is also a 50% duty cycle, logic level, squared signal. The output 60 of the zero cross detector 54 is provided to the digital delay 62. The digital delay 62 for the phase current Ic is required to account for capacitive loads that may be used in conjunction with some inductive motors. In particular, the motor 44 will often have power factor correction capacitors installed. When operating in the generator mode, these capacitors present a highly capacitive load to the motor 44. If the motor 44 has a highly capacitive load and is acting as a generator, the motor will actually have Ic slightly leading Vab. Since Ic is slightly leading Vab, a motor in the generating mode operating into a purely capacitive power line would go undetected. This occurs because, for each positive going edge of Vab, Ic is positive and, for each negative going edge of Vab, Ic is negative. Consequently, regeneration into a purely capacitive power line appears to represent a positive power factor. In such case, a momentary power loss would go undetected, since the leading Ic has the same logic sense as Vab. By delaying the Ic signal, the proper phasing relationship is restored between Vab and Ic, so that the momentary power loss condition can be properly detected. After the delay, the delayed digital Ic measurement is then presented to the input of the microprocessor 58 by the output 64.

The Vab signal 56 is fed to an edge sensitive interrupt pin in the microprocessor 58. When the microprocessor 58 receives such an interrupt, the microprocessor 58 also reads the level of the Ic input pin 64. A test is made to determine if a momentary power loss condition exists. If microprocessor 58 sensed a positive going Vab edge and Ic is currently positive, the motor 44 may be operating as a motor. Similarly, when the Vab transition is negative going and Ic is negative, the motor 44 may be operating as a motor. If either of these tests fail, a possible momentary power loss condition exists. The motor 44 is in the motor mode of operation if the test at each of the positive and negative Vab transitions is satisfied such that Ic is respectively positive and negative.

Since noise conditions may be present and causing the possible momentary power loss detection, a judgment that a momentary power loss condition exists should not be made based solely on the detection of a single fault in the above logic. Care must be taken to prevent any nuisance trips, with motor 44 being disconnected from three-phase supply 36 by the microprocessor 58 when a momentary power loss has not actually occurred. Since the detection scheme of the present invention works on both positive and negative Vab transitions, there are twice as many opportunities to detect a momentary power loss condition as compared to only looking at one transition per cycle. This sampling twice per cycle permits obtaining a sufficient number of data samples in a short period of time to be reasonably sure that a true momentary power loss is present, as indicated by failing the test a reasonable number of times, while still providing sufficient time to disconnect the motor 44 from the three-phase supply 36 before a reapplication of power takes place. A reasonable number of failures is judged to be three. Since noise is random, there is a very low probability that the noise will cause three consecutive test failures, thereby minimizing noise as a source of false trips. Effectively, a fault disconnect signal can be generated in three half line cycles.

Three failures consecutively is the condition that exists when the motor 44 is regenerating current back into the utility grid, the utility grid being represented by three-phase supply 36. A different condition exists when the momentary power loss is due to a buss transfer. A buss transfer may occur, for instance when the power is transferred to a back-up generator as a result of a detected problem with the line power, such as a brown-out. During a buss transfer, the three-phase contact 46 is open while the transfer is being made from one buss to another. There is no current flow in any phase since the motor 44 is operating into an open circuit. The squared up Ic signal is no longer changing sinusoidally each cycle, but is remaining at either a positive or negative. A positive Ic represents a logic state of 1, or a high logic state. A negative Ic represents a logic state of zero, or a low logic state.

In the case described above, Ic will be either a constant positive or a constant negative. Therefore, when the microprocessor 58 receives an interrupt from a Vab transition, performing the above test reveals a momentary power loss only every other transition, since alternating samples of Vab and Ic will be of the sense that is seen in the motor mode. Accordingly, a buss transfer situation does not meet the three consecutive failures criteria. A second test is required to diagnose this momentary power loss that is due to a buss transfer. The second test recognizes the above alternating pattern and generates a momentary power loss condition signal if three out of the five past samples fail. This three out of five test allows good noise immunity as well as prompt diagnosis, with diagnosis occurring in two and a half power cycles.

This logic would be quite adequate except: for the possibility of a phase loss causing a misdiagnosis. A phase loss is the loss of power in either of the a, b, or c phases from the three-phase supply 36. Most phase losses are detected when the averaged phase current in the failed phase is detected to be significantly less than the other two phases. This averaging introduces a large time constant. The large time constant prevents diagnosis of this condition, within the two and a half cycle time constraint for diagnosing a momentary power loss, if only the average phase current is used to differentiate this condition from a true momentary power loss.

During a phase loss, the motor 44 is running in a single phase condition. The normal three phase voltage and current phase angle relationships depicted in FIG. 6 no longer are the same. The relationships in this condition depend upon which phase is lost. During a phase loss, there are three different conditions that can exist in the momentary power loss detection logic. During a loss of phase a, the momentary power loss algorithm senses a failure on three consecutive failures. During a loss of phase b, the momentary power loss algorithm does not sense any failure. During a loss of phase c, the momentary power loss algorithm fails due to a non-changing Ic. Loss of phase c looks like a buss transfer to the algorithm.

A second phase current, in addition to Ic, must be sampled in order to avoid misdiagnosing a phase loss as a momentary power loss. Accordingly, in FIG. 1, the current transformer 66 senses the a phase current, Ia, and provides that signal to the zero cross detector 68. The zero cross detector 68 provides an output 70 to the microprocessor 58 each time that Ia crosses the zero current condition.

Figure 7:
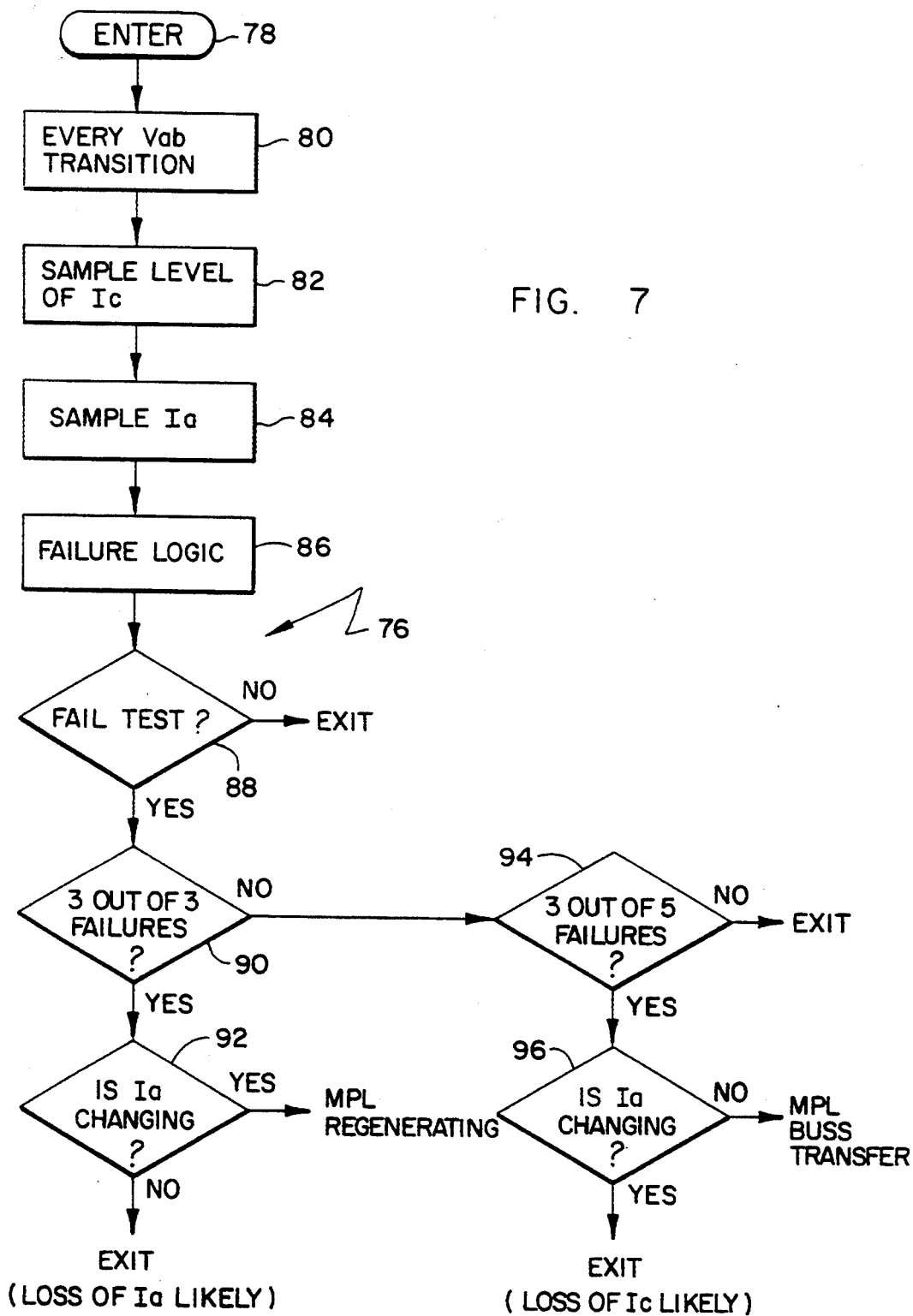
FIG. 7 is a logic sequence of the routine that the microcomputer follows to determine if a momentary power loss fault exists.

The algorithm block diagram 76 depicted in FIG. 7 presents the series of steps performed by the microprocessor 58 to determine if a momentary power loss condition exists. The routine is entered as indicated at step 78. Step 80 is effectively a timing function upon which the remainder of the routine is based. The remainder of the routine is commenced at each Vab positive going transition and at each Vab negative going transition. Since this is a sine wave function, there are two of such transitions for each cycle.

At the time of transition of Vab, an input is provided to the microprocessor 58 that is representative of Ic and Ia in steps 82, 84 respectively. The Ic signal and the Vab signals are compared in the failure logic of step 86. Step 86 reads the logic state (polarity) of Ic at each of the positive and negative going transition states of the Vab. The test is considered passed if Ic is positive (high) for a positive going transition of Vab or if Ic is negative (low) for a negative going transition of Vab. If these states are not seen, the test at this particular Vab transition is considered failed. Step 88 determines the next action based upon the results of step 86. If the test did not fail, then the routine is exited. However, if the test did fail, the routine progresses to step 90.

Step 90 is utilized to ensure the robustness of the data. It is important that a high degree of certainty exist prior to disconnecting the motor 44. Accordingly, step 90 checks to see if the failure has registered on three consecutive transitions of Vab. If the answer is yes, the routine proceeds to step 92. Step 92 is a phase loss check. As indicated above, phase a current provides a good check to determine if a phase loss has occurred since the failure logic of step 86 fails on three consecutive transitions when there is a loss of phase a. Step 92 then looks to see if Ia is transitioning as a square sine wave. If Ia is still transitioning, then the three consecutive failures sensed in logic step 90 were due to a momentary power loss condition as opposed to a loss of phase. This is the case since a loss of phase a will be reflected as a phase that is not changing. When the answer to step 92 is yes, the microprocessor 58 provides a feedback signal to open the three-phase contact 46 and to isolate the motor 44 by opening contact 46.

When the answer developed by step 90 is no, it is known that the motor 44 is not regenerating, but there may still be a buss transfer problem that requires disconnecting the motor 44. Accordingly, step 94 looks to see if there is a failure on any three out of five transitions of Vab. As previously indicated, a buss transfer condition has a steady state Ic signal to the microprocessor 58 that will satisfy the motor mode logic on every other Vab transition. Therefore, the routine of step 94 looks at three of five transitions. If the answer is no (that there are not three of five failures), there is not a momentary power loss condition and the routine is exited. If the answer is yes, a final check to determine if a phase loss has occurred is made.

This final check is made by step 96. Step 96 again looks to see if Ia is transitioning as a squared sine wave. There is no sinusoidal transition of Ia in the event of a buss transfer problem. This is the case since the regenerated voltage produced by the motor 44 is not being fed into a load. Accordingly, all the currents are at either a positive or a negative state. This is an indication to distinguish a momentary power loss condition caused by a buss transfer problem from a phase loss problem. When the answer to step 96 is no (e.g., that Ia is not transitioning as a sine wave thereby indicating that a momentary power loss condition is present), the microprocessor 58 provides a feedback signal to open the three-phase contact 46 and to isolate the motor 44. If the answer to step 96 is yes, it is determined that momentary power loss does not exist, but that the problem is likely a phase loss and the routine is exited.

Although the invention is described with respect to a preferred embodiment, modifications thereto will become apparent to those skilled in the art. Therefore, the scope of the invention is to be determined by reference to the claims which follow.

We claim:

1. A fault detector for detecting a momentary power loss in a three-phase, alternating current power supply, the power supply being connected via three power lines to a motor and powering said motor, comprising:

detector means for detecting when the motor switches from a mode of operation as a motor to a mode of operation as a generator; and processor means, operably coupled to the detector means and responsive to a fault signal for disconnecting the motor from the power source;

said processor means including:

means for sensing the polarity of the voltage that exists between selected first and second power lines;

means for sensing the polarity of the current that exists in the third power line; and, means for determining the polarity of the power factor of the motor utilizing said sensed voltage polarity and said sensed current polarity.

2. A fault detector as claimed in claim 1, the detector means further including:

means for sensing the direction that the polarity of the voltage that exists between selected first and second power lines is going at the time that the voltage crosses the zero voltage line; and, means for sensing the polarity of the current that exists in the third power line at the time that the voltage that exists between selected first and second power lines at the time that the voltage crosses the zero voltage line.

3. A fault detector as claimed in claim 1, wherein the fault signal is generated at least within the time period defined by three half line cycles.

4. A fault detector for detecting a momentary power loss in a three-phase, alternating current power supply, the power supply being connected via three power lines to a motor and powering said motor, comprising:

detector means for detecting when the motor switches from a mode of operation as a motor to a mode of operation as a generator; and processor means, operably coupled to the detector means and responsive to a fault signal for disconnecting the motor from the power source;

wherein the detector means includes means for distinguishing between a momentary power loss due to a line power loss and a buss transfer and the conditions resulting from noise on the power lines and loss of a phase of power.

5. A fault detector for detecting a momentary power loss in a three-phase, alternating current power supply, the power supply being connected via three power lines to a motor and powering said motor, comprising:

detector means for detecting when the motor switches from a mode of operation as a motor to a mode of operation as a generator; and processor means, operably coupled to the detector means and responsive to a fault signal for disconnecting the motor from the power source;

wherein the detector means includes:

means for sensing the transition from one polarity to the other of an alternating voltage taken between two of the three phases;

means for sensing the polarity of said voltage after the transition from one polarity to the other;

means for sensing the polarity of the current in the third of the three phases at the time of said voltage transition;

signal generation means for generating a fault signal responsive to detecting that the polarity of said current is opposite the polarity of said voltage transition on three consecutive voltage transitions; and signal generation means for generating a fault signal responsive to detecting that the polarity of said current is opposite the polarity of said voltage transition for any three out of five consecutive voltage transitions.

6. A fault detector for detecting a momentary power loss in a three-phase, alternating current power supply, the power supply being connected via three power lines to a motor and powering said motor, comprising:

detector means for detecting when the motor switches from a mode of operation as a motor to a mode of operation as a generator; and processor means, operably coupled to the detector means and responsive to a fault signal for disconnecting the motor from the power source;

wherein the detector means includes:

means for sensing the transition from one polarity to the other of an alternating voltage taken between two of the three phases;

means for sensing the polarity of said voltage after the transition from one polarity to the other;

means for sensing the polarity of the current in the third of the three phases at the time of said voltage transition; and signal generation means for generating a fault signal responsive to detecting that the polarity of said current is opposite the polarity of said voltage transition on three consecutive voltage transitions.

7. A fault detector for detecting a momentary power loss in a three-phase, alternating current power supply, the power supply being connected via three power lines to a motor and powering said motor, comprising:

detector means for detecting when the motor switches from a mode of operation as a motor to a mode of operation as a generator; and processor means, operably coupled to the detector means and responsive to a fault signal for disconnecting the motor from the power source;

wherein the detector means includes:

means for sensing the transition from one polarity to the other of an alternating voltage taken between two of the three phases;

means for sensing the polarity of said voltage after the transition from one polarity to the other;

means for sensing the polarity of the current in the third of the three phases at the time of said voltage transition; and signal generation means for generating a fault signal responsive to detecting that the polarity of said current is opposite the polarity of said voltage transition for any three out of five consecutive voltage transitions.

8. A fault detection method for detecting a momentary power loss in a three-phase, alternating current, power supply, the power supply being connected to and powering a motor, comprising:

detecting when the motor switches from a mode of operation as a motor to a mode of operation as a generator; and, generating a fault disconnect signal in response to said change of mode of operation to initiate disconnecting the motor from the power source;

wherein the method includes logic for distinguishing between a line power loss, a buss transfer, noise, and a power phase loss.

9. A method of fault detection as claimed in claim 8, wherein the fault disconnect signal is generated at least within the time period defined by three half line cycles.

10. A fault detection method for detecting a momentary power loss in a three-phase, alternating current, power supply, the power supply being connected to and powering a motor, comprising:

detecting when the motor switches from a mode of operation as a motor to a mode of operation as a generator; and, generating a fault disconnect signal in response to said change of mode of operation to initiate disconnecting the motor from the power source;

wherein the method includes:

logic for sensing the transition from one polarity to the other of an alternating voltage taken between two of the three phases;

logic for sensing the polarity of said voltage after the transition from one polarity to the other;

logic for sensing the polarity of the current in the third of the three phases at the time of said voltage transition; and generation of a fault signal responsive to detecting that the polarity of said current is opposite the polarity of said voltage transition on three consecutive voltage transitions.

11. A fault detection method for detecting a momentary power loss in a three-phase, alternating current, power supply, the power supply being connected to and powering a motor, comprising:

detecting when the motor switches from a mode of operation as a motor to a mode of operation as a generator; and, generating a fault disconnect signal in response to said change of mode of operation to initiate disconnecting the motor from the power source;

wherein the method includes:

logic for sensing the transition from one polarity to the other of an alternating voltage taken between two of the three phases;

logic for sensing the polarity of said voltage after the transition from one polarity to the other;

logic for sensing the polarity of the current in the third of the three phases at the time of said voltage transition; and generation of a fault signal responsive to detecting that the polarity of said current is opposite the polarity of said voltage transition on three consecutive voltage transitions.

12. A fault detection method for detecting a momentary power loss in a three-phase, alternating current, power supply, the power supply being connected to and powering a motor, comprising:

detecting when the motor switches from a mode of operation as a motor to a mode of operation as a generator; and, generating a fault disconnect signal in response to said change of mode of operation to initiate disconnecting the motor from the power source;

wherein the method includes:

logic for sensing the transition from one polarity to the other of an alternating voltage taken between two of the three phases;

logic for sensing the polarity of said voltage after the transition from one polarity to the other;

logic for sensing the polarity of the current in the third of the three phases at the time of said voltage transition; and generation of a fault signal responsive to detecting that the polarity of said current is opposite the polarity of said voltage transition on for any three out of five consecutive voltage transitions.

13. A method of protecting a compressor motor of a refrigeration system using a three-phase AC power supply, the AC power supply providing the power to the motor via three power lines, comprising the steps of:

monitoring the line-to-line voltage between a selected first and second lines of the power supply to the compressor motor;

monitoring the line current of the third line of the power supply to the compressor motor;

determining when the line-to-line voltage transitions the zero voltage line and the whether such voltage transition is negative-going or positive-going;

determining the negative or positive state of the monitored line current at the time of transition of the line-to-line voltage;

counting successive transitions of the line-to-line voltage transitions;

comparing the line-to-line voltage sign and the line current sign at the time of each transition of the line-to-line voltage; and generating a motor disconnect signal upon the occurrence of any three out of five consecutive instances of the line current being of the alternating sign as the line-to-line voltage.

14. The method of claim 13 including the further step of generating a motor disconnect signal upon the occurrence of three consecutive instances of the line current being of the opposite sign as the line-to-line voltage.

15. A method of protecting a compressor motor of a refrigeration system using a three-phase AC power supply, the AC power supply providing the power to the motor via three power lines, comprising the steps of:

monitoring the line-to-line voltage between a selected first and second lines of the power supply to the compressor motor;

monitoring the line current of a third line of the power supply to the compressor motor;

monitoring the line current of the first line of the power supply to the compressor motor;

determining when the line-to-line voltage transitions the zero voltage line and the whether such voltage transition is negative-going or positive-going;

determining the negative or positive state of the monitored third line current at the time of transition of the line-to-line voltage;

counting successive transitions of the line-to-line voltage transitions;

comparing the line-to-line voltage sign and the third line current sign at the time of each transition of the line-to-line voltage;

determining if the first current is in a steady state condition;

generating a motor disconnect signal upon the occurrence of three consecutive instances of the third line current being of the opposite sign as the line-to-line voltage and if the first line current is not in a steady state condition; and, means for generating a motor disconnect signal upon the occurrence of three consecutive instances of the third line current being of the opposite sign as the line-to-line voltage and if the first line current is in a steady state condition.

16. A method of fault detection as claimed in claim 15 wherein the motor disconnect signal is generated at least within the time period defined by three half line cycles.

17. Apparatus for protecting a compressor motor of a refrigeration system using a three-phase AC power supply, the AC power supply providing the power to the motor via three power lines, comprising:

a motor;

a three-phase AC power supply;

means for monitoring the line-to-line voltage between a selected first and second lines of the power supply to the compressor motor;

means for monitoring the line current of the third line of the power supply to the compressor motor;

means for monitoring the line current of the first line of the power supply to the compressor motor;

means for determining when the line-to-line voltage transitions the zero voltage line and the whether such voltage transition is negative-going or positive-going;

means for determining the negative or positive state of the monitored third line current at the time of transition of the line-to-line voltage;

means for counting successive transitions of the line-to-line voltage transitions;

means for comparing the line-to-line voltage sign and the third line current sign at the time of each transition of the line-to-line voltage;

means for determining if the first current is in a steady state condition;

means for generating a motor disconnect signal upon the occurrence of any three out of five consecutive instances of the third line current being of the alternating sign as the line-to-line voltage and if the first line current is in a steady state condition.

18. The apparatus of claim 17 further including means for generating a motor disconnect signal upon the occurrence of three consecutive instances of the third line current being of the opposite sign as the line-to-line voltage and if the first line current is not in a steady state condition.

19. Apparatus for fault detection as claimed in claim 18 wherein the motor disconnect signal is generated at least within the time period defined by five half line cycles.

* * * * *